United States Patent [19]

Squires

[11] 4,290,100
[45] Sep. 15, 1981

[54] FOUR TERMINAL VOLTAGE TRIPLER FOR MONOLITHIC LCD CLOCK CIRCUIT

[75] Inventor: David R. Squires, Cupertino, Calif.
[73] Assignee: Intersil, Inc., Cupertino, Calif.
[21] Appl. No.: 132,819
[22] Filed: Mar. 24, 1980
[51] Int. Cl.³ .............................................. H02M 3/155
[52] U.S. Cl. ..................................... 363/60; 363/147; 368/204
[58] Field of Search .......................... 363/59, 60, 147; 307/110; 340/811; 368/203, 204

[56] References Cited

U.S. PATENT DOCUMENTS

| | | | |
|---|---|---|---|
| 3,816,803 | 6/1974 | Gordon | 320/1 |
| 3,975,671 | 8/1976 | Stoll | 363/60 |
| 4,001,664 | 1/1977 | Hyltin | 363/59 |
| 4,047,091 | 9/1977 | Hutchines | 363/59 |
| 4,061,929 | 12/1977 | Asano | 363/60 |
| 4,068,295 | 1/1978 | Portmann | 363/60 |
| 4,106,086 | 8/1978 | Holbrook et al. | 363/60 |

FOREIGN PATENT DOCUMENTS

| | | | |
|---|---|---|---|
| 2530870 | 2/1976 | Fed. Rep. of Germany | 368/204 |
| 52-26419 | 2/1977 | Japan | 363/60 |

Primary Examiner—William H. Beha, Jr.
Attorney, Agent, or Firm—Spensley, Horn, Jubas & Lubitz

[57] ABSTRACT

A voltage tripler for multiplying a DC voltage from a battery to provide a driving voltage for an LCD display in a digital clock. The circuit includes a charging capacitor and two storage capacitors and a plurality of switches for interconnecting the capacitors with the battery. The switches are controlled by means of driving circuitry which provides break-before-make type switching. The operation of the circuit is divided into four phases. During an initial phase the charging capacitor is charged to the voltage of the battery. During the second phase the charging capacitor is connected in parallel with one of the storage capacitors in order to transfer a portion of the charge to the storage capacitor. During the third phase the charging capacitor is again connected to the battery to recharge the charging capacitor. During the fourth phase, the charging capacitor is connected in parallel with the other storage capacitor so as to transfer charge to the storage capacitor. By repeating the sequence a plurality of times, the voltage on each of the storage capacitors will approach that of the battery. By referencing one of the capacitors to the negative terminal of the battery, the voltage at the free terminal of the other capacitor will be three times the battery voltage. This circuit is implemented on a monolithic integrated circuit and requires four terminals instead of five as in the prior art, thereby decreasing pin count and saving significant chip area.

12 Claims, 6 Drawing Figures

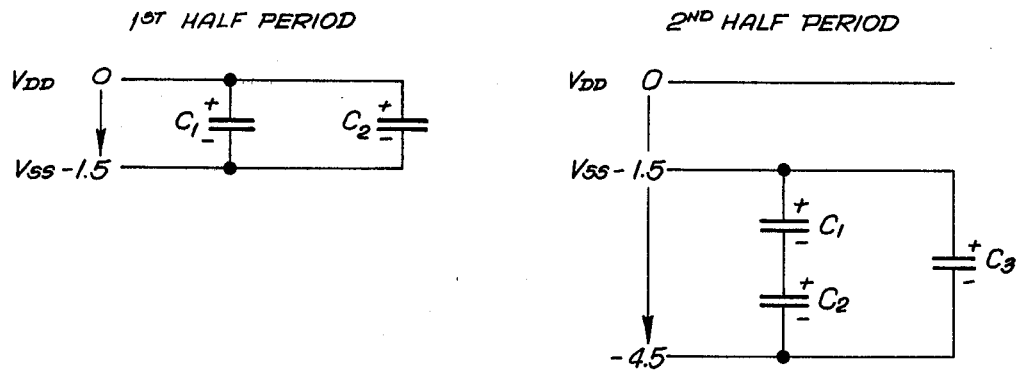
Fig. 1. PRIOR ART
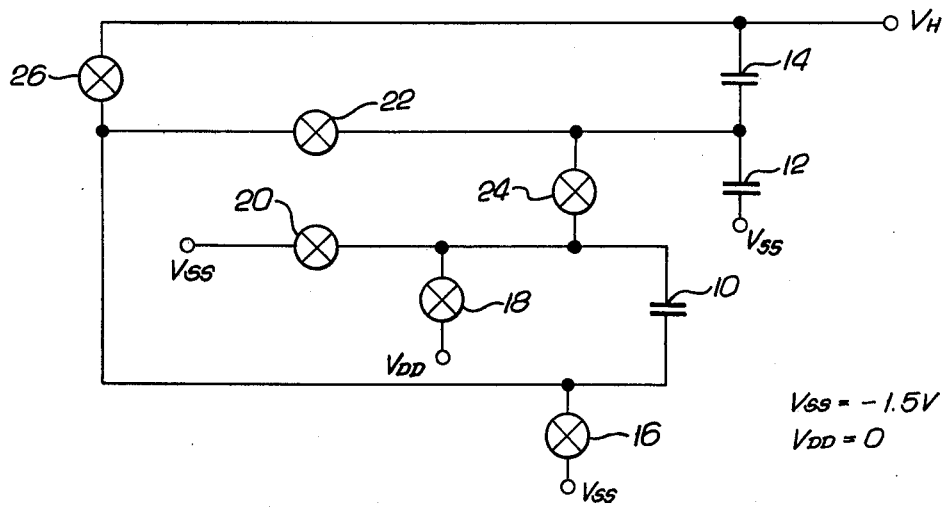
Fig. 2.
Fig. 3.
| | SWITCHES | | | | | |
|---|---|---|---|---|---|---|
| | 16 | 18 | 20 | 22 | 24 | 26 |
| PHASE 1 | CLOSED | CLOSED | OPEN | OPEN | OPEN | OPEN |
| PHASE 2 | OPEN | OPEN | CLOSED | CLOSED | OPEN | OPEN |
| PHASE 3 | CLOSED | CLOSED | OPEN | OPEN | OPEN | OPEN |
| PHASE 4 | OPEN | OPEN | OPEN | OPEN | CLOSED | CLOSED |
Fig. 4.
| PHASE 1 | CHARGE C10 |
|---|---|
| PHASE 2 | TRANSFER CHARGE FROM C10 TO C12 |
| PHASE 3 | RECHARGE C10 |
| PHASE 4 | TRANSFER CHARGE FROM C10 TO C14 |

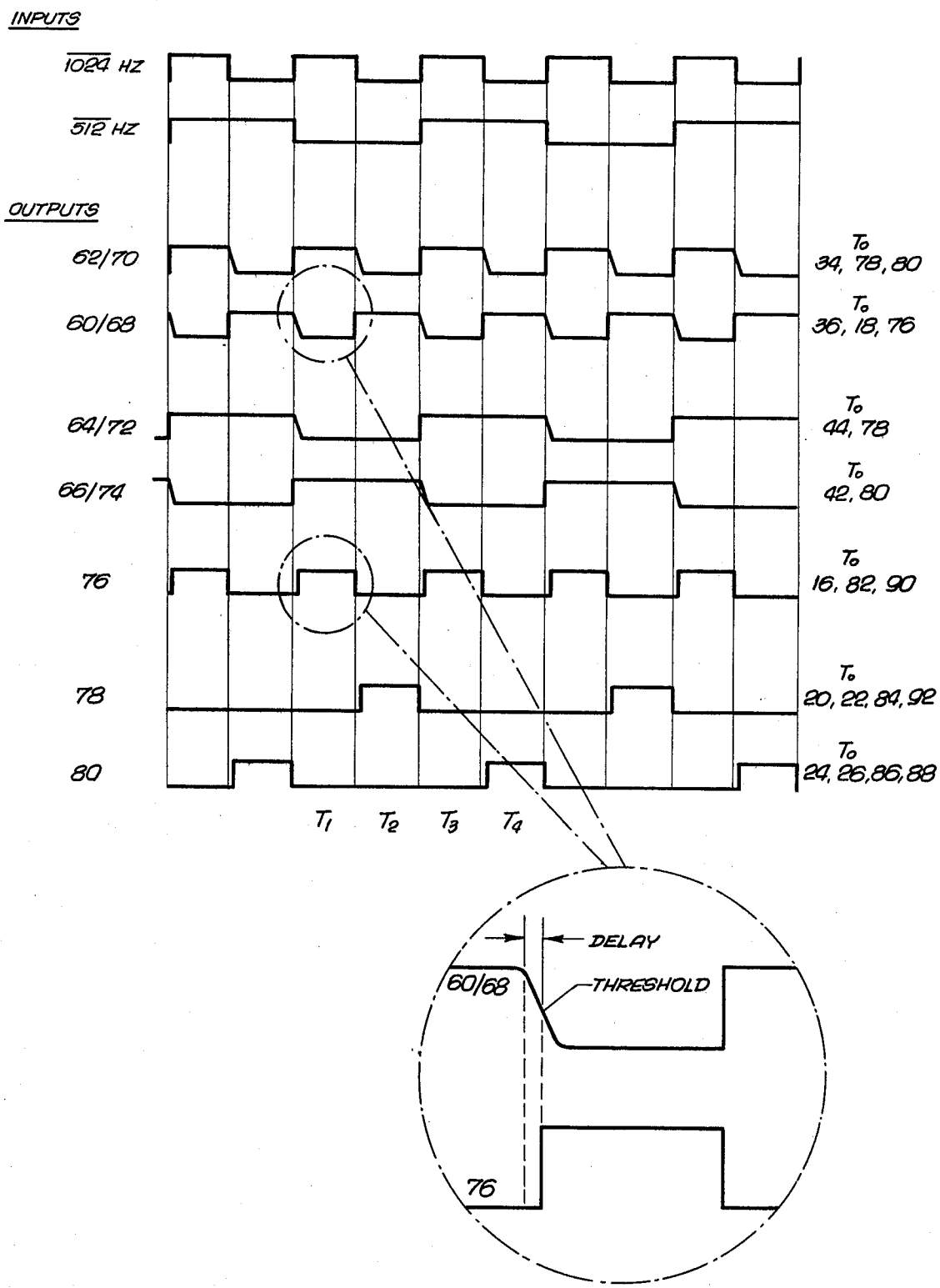

FOUR TERMINAL VOLTAGE TRIPLER FOR MONOLITHIC LCD CLOCK CIRCUIT

BACKGROUND OF THE INVENTION

This disclosure relates to voltage multipliers and in particular to a voltage tripler for providing a 4.5 volt supply for driving a liquid crystal display (LCD) of a digital clock which utilizes a 1.5 volt battery for power.

DESCRIPTION OF THE PRIOR ART

The prior art method of multiplying a DC voltage of 1.5 volts to a level of 4.5 volts for the purpose of driving an LCD clock display utilizes charge transfer with switched capacitors. In the case of an integrated circuit digital clock, the prior art tripler requires three capacitors, five terminals (or pads) on the chip and a single digital driving signal (typically 512 Hz). During one half of the period of the driving signal, two of the three capacitors are charged across the battery in a parallel connection. This charges each of the capacitors to 1.5 volts. During the second half period, the two capacitors are connected in series and referenced to the negative side of the battery and one end of the third capacitor. This puts the total voltage on the third capacitor at three times that of the battery. The third capacitor may be thought of as a storage capacitor or filter capacitor. This method is shown schematically in FIG. 1.

Although the prior art method provides the required multiplied voltage, it requires the use of five terminals on a chip. Because of size limitations with chips, it is desirable to use as few terminals as possible for any particular function. The present invention is directed to a voltage tripler which requires only four terminals on a chip instead of the usual five.

SUMMARY OF THE INVENTION

The present invention is directed to a voltage multiplier for use in driving an LCD display of a digital clock which requires only four terminals on a chip. As is the case with the prior art, the multiplier of the present invention utilizes three capacitors. However, two digital driving signals are used as opposed to the use of a single driving signal in the prior art. The circuit includes a plurality of FET switches which are sequentially switched through four phases. During the first phase the first, or charging, capacitor is connected to a voltage supply such as a battery and charged to the voltage of the battery. During a second phase, the charging capacitor is connected in parallel with the second capacitor. This serves to equalize the voltage on the charging capacitor and second capacitor by transferring charge to the second capacitor. During the third phase, the charging capacitor is again connected across the battery and charged to the battery voltage. During the fourth phase, the third capacitor is connected in parallel with the charging capacitor and the voltage across the two will equalize. The second and third capacitors are connected in series. By repeating the four phase sequence a number of times, the voltage across each of the second and third capacitors will asymptotically approach the voltage of the battery. The total voltage across the two series connected capacitors will therefore approach twice the battery voltage. By referencing one of the two capacitors to the negative terminal of the battery, the voltage at the free terminal of the other capacitor with respect to the positive terminal of the battery will be three times the battery voltage. The circuitry which is used to implement the above sequence requires only four terminals as opposed to the five required by the prior art.

BRIEF DESCRIPTION OF THE DRAWINGS

In the drawings:

FIG. 1 shows two phases of a capacitor configuration used in prior art voltage multipliers;

FIG. 2 is a schematic diagram showing the capacitor interconnection and switching arrangement of the present invention;

FIG. 3 is a table of the switching sequence of the circuit of FIG. 2;

FIG. 4 is a table of the functional sequence of the circuit of FIG. 2;

FIG. 6 is a timing diagram of the circuit of FIG. 5.

DESCRIPTION OF THE PREFERRED EMBODIMENT

Figure 5:
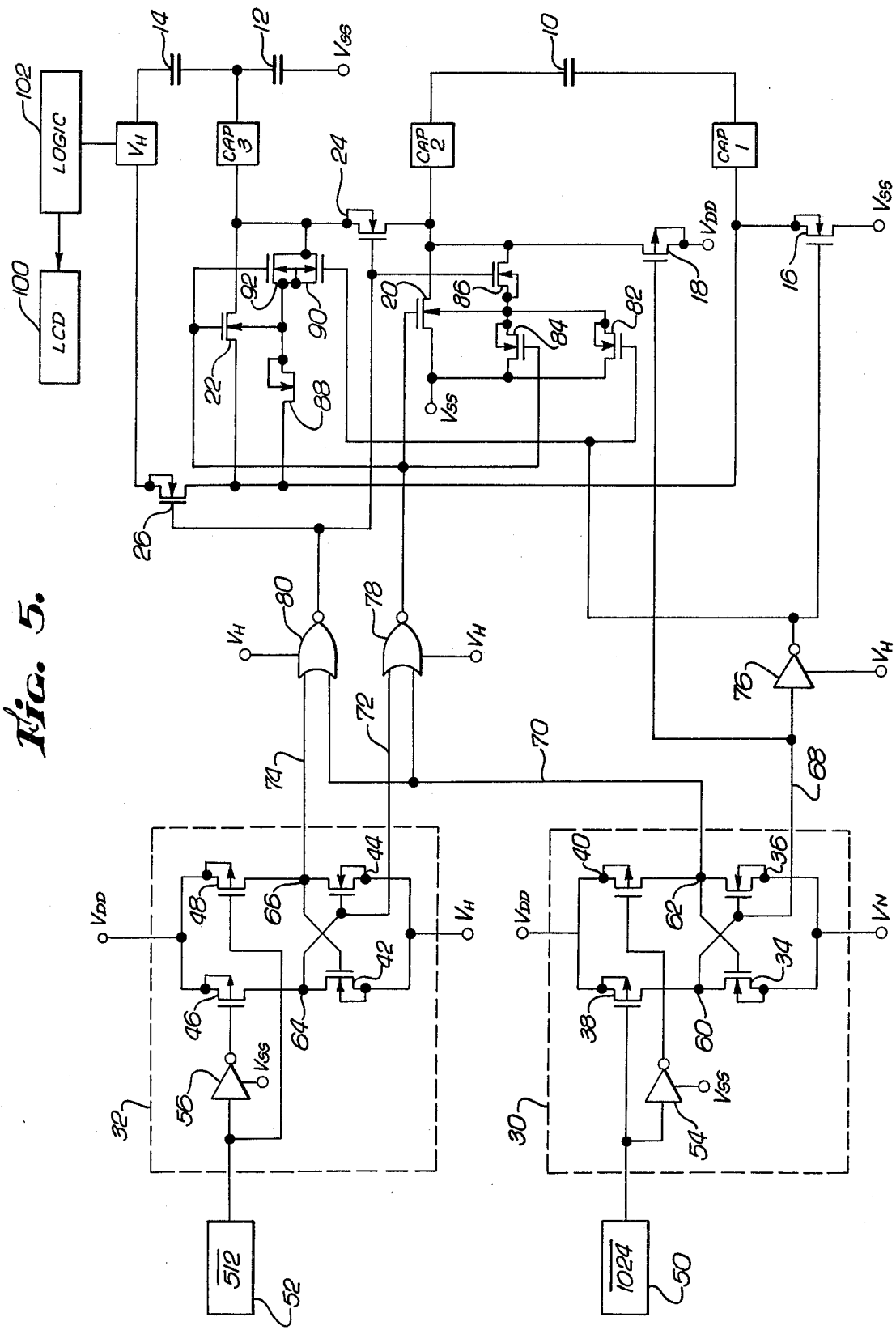
FIG. 5 is a more detailed circuit schematic of the present invention.

Referring to FIG. 2, the voltage tripler of the present invention includes three capacitors 10, 12 and 14 and a plurality of switches 16-26 for controlling the interconnections of the capacitors. The voltage multiplication is accomplished by switching the switches through four phases a plurality of times. The switching and operational sequences are shown in FIGS. 3 and 4 respectively. During the first phase, switches 16 and 18 are closed and the remainder of the switches opened to connect one terminal of the capacitor 10 to the positive side ($V_{dd}$) of a battery and the other terminal of the capacitor 10 to the negative side ($V_{ss}$) of the battery. This will charge the capacitor 10 to a voltage approximately equal to that of the battery.

During the second phase of the sequence, the switches 20 and 22 are closed and the remaining switches opened. This connects the capacitor 10 in parallel with the capacitor 12 and causes a portion of the charge on the capacitor 10 to be transferred to the capacitor 12. The capacitors 10 and 12 are approximately equal in value and about one half of the charge on the capacitor 10 will therefore be transferred to the capacitor 12. The voltage drop across the capacitor 12 at this point will be approximately one half of the voltage of the battery.

During the third phase of the sequence, switches 16 and 18 are again closed so as to recharge the capacitor 10 to the battery voltage. After the capacitor 10 has been charged, the switches 16 and 18 are opened and switches 24 and 26 are closed. The closing of the switches 24 and 26 connects the capacitor 14 in parallel with the capacitor 10, and charge is therefore transferred from the capacitor 10 to the capacitor 14. As is the case with the capacitor 12, the value of the capacitor 14 is approximately equal to that of the capacitor 10 and approximately one half of the charge of the capacitor 10 will be transferred to the capacitor 14.

The free end of the capacitor 12 is referenced to the negative terminal $V_{ss}$ of the battery and the other terminal of the capacitor 12 is connected in series with the capacitor 14. The free terminal of the capacitor 14 is the output terminal $V_h$ of the circuit. After the completion of the first sequence of four phases, the voltage on each of the capacitors 12 and 14 will be approximately one half of the voltage of the battery. By repeating the four phase sequence a plurality of times, charge will be transferred to the capacitors 12 and 14 until the voltage on each of them is approximately equal to the battery voltage. Thus, during the second sequence, the capacitor 10 will initially be charged to the voltage of the battery (1.5 volts in the present embodiment) and the voltage of the capacitor 12 will already be one half that of the battery (0.75 volts). During phase two of the second sequence, charge will be transferred from the capacitor 10 to the capacitor 12 until the voltages across them are equalized. Since the total voltage across the two capacitors is the 1.5 volts of the capacitor 10 and the 0.75 volts of the capacitor 12, charge will be transferred until the voltage across each of the capacitors 10 and 12 is one half of the sum of 1.5 and 0.75, i.e., until the voltage on each of the capacitors 10 and 12 is 1.125 volts. The charging sequence is similar with respect to the capacitor 14. By repeating the four phase sequence, the voltages on each of the capacitors 12 and 14 will asymptotically increase to that of the battery voltage, i.e., 1.5 volts. Therefore, the total voltage across the two series connected capacitors 12 and 14 will be three volts. Since the capacitor 12 is referenced to the negative terminal $V_{ss}$ of the battery, the voltage at the output terminal $V_h$ will be three volts below $V_{ss}$ or 4.5 volts below $V_{dd}$. Thus, the output $V_h$ referenced to $V_{dd}$ is three times the voltage of the battery.

Referring now to FIG. 5, a more detailed circuit arrangement of the voltage multiplier of the present invention is shown. The circuit shown in FIG. 5 is designed to be fabricated on a monolithic chip to which the capacitors 10, 12 and 14 are connected via four pads cap 1, cap 2, cap 3 and $V_h$. $V_h$ provides the multiplied output which drives a liquid crystal display 100 through a logic circuit 102. The circuit utilizes FET switches which are numbered in accordance with the switches of FIG. 2. The switching is controlled by means of a pair of clock inputs 50 and 52 which are connected through a pair of level shifters 30 and 32 respectively to suitable logic elements. If instantaneous switching of the switches 16–26 occurred, problems with charge leakage from the capacitors 10, 12 and 14 might develop. In order to avoid this problem, the level shifters 30 and 32 are utilized to provide the circuit with "break-before-make" switching. That is, between each of the four phases the switches which were closed in the prior phase are opened before the closing of the appropriate switches for the next phase. In addition, the level shifters 30 and 32 provide outputs which are sufficient to drive logic elements in the circuit.

The level shifter 30 receives an input from a clock 50, which in the present embodiment has a frequency of 1,024 Hz. Similarly, the level shifter 32 receives an input from a clock 52, which has a frequency of 512 Hz or one half the frequency of the clock 50. The frequencies of the clock inputs are illustrative only and many other frequencies could be used as long as the relationship between them remains 2:1. The function of each of the level shifters 30 and 32 is to provide a pair of outputs having the same frequency as the respective clock inputs but having delayed or sloped falling edges. The slope in the falling edges of the outputs of the level shifters 30 and 32 enables the delays to be generated in the switches so as to provide the break-before-make switching function.

The clock input to the level shifter 30 is connected to a P-channel FET switch 38 and to an inverter 54. The output of the inverter 54 is connected to a P-channel FET switch 40. The drain of the switch 38 is connected to the drain of an N-channel switch 34, the drain of the switch 40 is connected to the drain of an N-channel switch 34 and the drain of the switch 40 is connected to the drain of an N-channel switch 36. The sources of the switches 38 and 40 are connected to the positive terminal of the battery, while the wells and sources of the switches 34 and 36 are connected to $V_h$. The physical properties of the P-channel switches 38 and 40 is such that they have a much higher current drive than the N-channel switches 34 and 36. The N-channel switches 34 and 36 are long devices that have relatively low current drive capability. These properties enable the delays to be generated by the level shifter 30.

Assuming that the switch 38 is initially on, the point 60 will be at a "1" and the switch 36 will be turned on. The point 62 will thus be at a "0" level. Upon the occurrence of the next clock phase, the switch 38 will turn off and the switch 40 will turn on. Since the source of the switch 38 is referenced to $V_{dd}$ and the source of the switch 36 is referenced to $V_h$, the turning off of the switch 38 will be insufficient to turn off the switch 36. However, the turning on of the switch 40 will overdrive the switch 36 and pull the point 62 up to a "1". This overdrive condition is facilitated by the much higher current drive of the P-channel switches 38 and 40 with respect to the N-channel 34 and 36. As the point 62 changes to a "1" the switch 34 begins to turn on. This starts to pull the point 60 down towards "0".

The delay in the level shifter 30 is introduced by the fact that the P-channel switch 40 will pull the point 62 up to a "1" relatively quickly, i.e., on the order of 40 to 100 nanoseconds, whereas the turning on of the switch 34 will pull the point 60 down to "0" relatively slowly, i.e., on the order of 1 to 2 microseconds. Upon the occurrence of the next clock phase, the point 60 will be pulled up quickly and the point 62 will pull down relatively slowly. Thus, it can be seen that the two outputs 68 and 70 (connected to the points 60 and 62 respectively) of the level shifter 30 will have steep rising edges and delayed or sloped falling edges, as is shown in FIG. 6. The level shifter 32 functions in the same manner as the level shifter 30 and its output frequency will be one half that of the level shifter 30. The outputs 72 and 74 of the level shifter 32 are shown in FIG. 6.

The sloped falling edges of the outputs of the level shifters enables switching delays to be generated in the circuit. The output line 68 of the level shifter 30 is connected to an inverter 76 and to the switch 18. The output line 70 is connected to an input of a NOR gate 78 and a NOR gate 80. The output 72 of the level shifter 32 is connected to another input of the NOR gate 78 and the output 74 is connected to another input of the NOR gate 80. The slowly falling edges of the outputs 68–74 generate switching delays in the inverter 76 and the NOR gates 78 and 80. These delays can be seen in the timing diagrams of FIG. 6. As shown in the detail, when the output line 68 falls from a "1" to a "0", the inverter 76 will not switch until the line 68 falls below a certain threshold. There will therefore be a delay between the time the output line 68 begins to fall and the time the threshold is reached. The delay generated will be much shorter when the output line 68 changes from "0" to "1". Because of the time it takes for the output line 68 to change from "1" to "0", the delay will be on the order of 1 microsecond. The NOR gates 78 and 80 function similarly to the inverter 76 and will thus switch quickly upon the occurrence of a rising edge but with a delay upon the occurrence of a falling edge. In order to provide the break-before-make switching, the circuit of FIG. 5 is configured so that the turning off of the switches 16–26 is triggered by a rising edge of one of the outputs 68–74 and the turning on of the switches 16–26 is triggered by a falling edge of one of the outputs 68–74.

The four phases of a switching sequence of FIG. 5 will now be described with reference to the timing diagram of FIG. 6. During the first phase, labeled $T_1$, the output line 68 will be low and the P-channel switch 18 will therefore be turned on. The output of the inverter 76 will be high and the N-channel switch 16 will be therefore turned on. The turning on of the switches 16 and 18 connects the capacitor 10 across the battery and charges it up to the battery voltage. During this time, the outputs of the NOR gates 78 and 80 are low and the switches 20–26 are therefore turned off. At the beginning of the second phase, labeled $T_2$, the output line 68 will go high and the switches 16 and 18 will therefore be turned off. The output line 70 will go low at this point and after a short delay will cause the NOR gate 78 to turn on (since the output 72 was already low). This will cause the switches 20 and 22 to be turned on, thus connecting the capacitor 12 in parallel with the capacitor 10 and transferring charge to the capacitor 12. At the beginning of the third phase, labeled $T_3$, the output line 72 will quickly rise to a high level and turn off the NOR gate 78, thus closing the switches 20 and 22. The output line 68 will slowly fall and, after a brief delay, the switches 16 and 18 will again be turned on so as recharge the capacitor 10. At the end of the third time period the output line 68 will quickly go high, thus opening the switches 16 and 18 and the slowly falling output line 70 will cause the NOR gate 80 to be turned on (the output line 74 is low at this point). This will close the switches 24 and 26 and connect to the capacitor 14 in parallel with the capacitor 10. The sequence will be repeated and the pad $V_h$ will eventually be charged to a voltage which is three times the battery voltage as described with respect to FIG. 2.

In order to prevent latch up of the circuit of FIG. 5, a second group of FET switches 82–92 are included. The function of the switches 82–92 is to prevent forward biasing of the P-N diode junctions in the circuit and possible turn-on of a parasitic NPNP SCR structure which is inherent in the type of integrated circuit used (junction isolated C-MOS IC). During the first phase, the switch 18 will be on and cap 2 will therefore be at a potential of $V_{dd}$. The source and drain of the transistor 20 form a diode junction which must be reverse biased in order to prevent current flow therethrough. This is accomplished in the first phase by turning on the switch 82. This in effect causes the left side of the transistor switch 20 to be the source and the right side of the switch 20 to be the drain. Since the right side of the switch 20 is at a higher potential than the left side at this point ($V_{dd}$ versus $V_{ss}$) the source/drain diode junction is reverse biased. During the second phase, the switch 82 is turned on so that the left side of the switch 20 still serves as the source. During this phase the switch 20 is turned on. During the third phase the switch 82 is again turned on and the source/drain junction is again reverse biased. During the fourth phase, the pad cap 2 becomes more negative than $V_{ss}$ and the switch 86 is turned on so as to cause the right side of the switch 20 to become the source and the left side to become the drain. This again causes the source/drain diode junction to be reverse biased. The switches 82–86 are generally referred to as "body snatching" transistors and their use insures that at all times when the switch 20 is turned off or on, the body will be referenced to the most negative side (or source), thus insuring proper operation of the circuit. The switches 88–92 operate in conjunction with the switch 22 in identical fashion to the switches 82–86.

In summary, the present invention is directed to a new voltage multiplier circuit and particularly to a voltage tripler for supplying a driving voltage to an LCD display of a digital clock. The voltage tripler includes a charging capacitor and a pair of series connected storage capacitors, and a plurality of switches for selectively connecting the charging capacitor to a battery and to the storage capacitors. The circuit includes driving circuitry comprising a pair of level shifters which facilitate break-before-make switching of the switches to prevent any charge leakage. When fabricated on an integrated circuit chip, the circuit requires only four pads as opposed to five in prior art configurations.

Although the invention has been described in terms of one embodiment it should be recognized that modifications and variations will readily occur to those skilled in the art and consequently it is intended that the claims be interpreted to cover such modifications and variations.

I claim:

1. A circuit for tripling the voltage of a D.C. voltage supply comprising:
    a first capacitor;
    a second capacitor having a first terminal connected to a first voltage supply;
    a third capacitor connected in series with the second capacitor, the third capacitor including a first terminal connected to the second capacitor and an output terminal; and
    a plurality of switches for sequentially connecting the voltage supply and the capacitors in the following configurations:
    (a) a first phase during which the first capacitor is connected across the voltage supply to thereby charge the first capacitor,
    (b) a second phase during which the first capacitor is connected in parallel with the second capacitor,
    (c) a third phase during which the first capacitor is again connected across the voltage supply, and
    (d) a fourth phase during which the first capacitor is connected in parallel with the second capacitor, whereby by repeating said four phases a plurality of times, the voltage at the output terminal referenced to a second terminal of the voltage supply will approach three times the supply voltage.

2. The voltage tripler of claim 1 wherein said switches are FET switches.

3. The voltage tripler of claim 1 wherein said voltage supply has a nominal value of 1.5 volts.

4. The voltage tripler of claim 2 including timing means for breaking switch connections at the end of one phase prior to making switch connections at the beginning of a subsequent phase.

5. A circuit for multiplying the voltage of a DC supply voltage having first and second terminals comprising:
    a charging capacitor;
    a first storage capacitor having a first terminal connected to the first terminal of the voltage supply;

a second storage capacitor having a first terminal connected to the second terminal of the first storage capacitor, the second terminal of the second storage capacitor comprising an output of said circuit;

a plurality of switches for selectively interconnecting the capacitors and the voltage supply; and clock controlled driving circuitry for sequentially operating the switches so as to:
(a) charge the charging capacitor across the voltage supply,
(b) transfer a portion of the charge on the charging capacitor to the first storage capacitor,
(c) again charge the charging capacitor across the voltage supply,
(d) transfer a portion of the charge on the charging capacitor to the second storage capacitor, and
(e) repeat steps (a) through (d), whereby the voltage of the output terminal referenced to the second terminal of the voltage supply will asymptotically increase to a value which is a predetermined multiple of the supply voltage.

6. The circuit of claim 5 wherein said switches are FET switches.

7. The circuit of claim 6 wherein said switches and driving circuitry are contained on a monolithic chip.

8. The circuit of claim 6 wherein the driving circuitry includes delay circuitry for opening the switches at the end of a sequential step prior to closing selected switches to perform the next sequential step, thereby preventing charge leakage in the circuit.

9. The circuit of claim 5 wherein the output terminal is connected to a liquid crystal display through a logic circuit.

10. The circuit of claim 5 wherein the DC supply voltage is a battery.

11. The circuit of claim 10 wherein the first storage capacitor is connected to the negative terminal of the battery and wherein the switches include:
first and second switches for connecting the negative terminal of the battery with both terminals of the charging capacitor;
a third switch for connecting a first terminal of the charging capacitor with the positive terminal of the battery;
a fourth switch for connecting a second terminal of the charging capacitor with the second terminal of the first storage capacitor;
a fifth switch for connecting the first terminal of the charging capacitor with the first terminal of the second storage capacitor; and
a sixth switch for connecting the second terminal of the charging capacitor with the second terminal of the second storage capacitor.

12. The circuit of claim 8 wherein said delay circuitry includes:
a first level shifter having an input of a first clock frequency and a pair of out of phase outputs of substantially the same frequency as the first clock frequency, wherein the rising edges of said outputs are steeper than their falling edges;
a second level shifter having an input of a second clock frequency and a pair of out of phase outputs of substantially the same frequency as said second clock frequency, wherein the rising edges of said outputs are steeper than their falling edges; and
logic circuitry connected between the outputs of the level shifters and the switches.

* * * * *